C. G. POLLEYS.
POWER TRANSMITTING APPARATUS FOR AUTOMOBILES.
APPLICATION FILED NOV. 3, 1915.
1,219,040.  Patented Mar. 13, 1917.
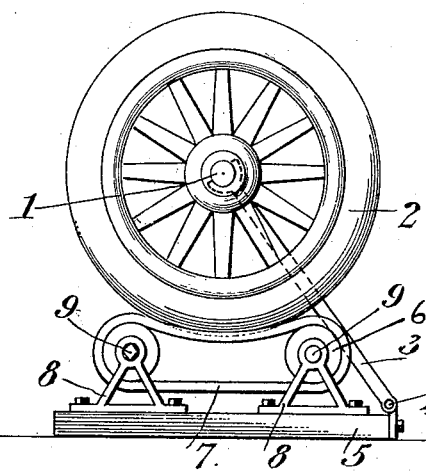
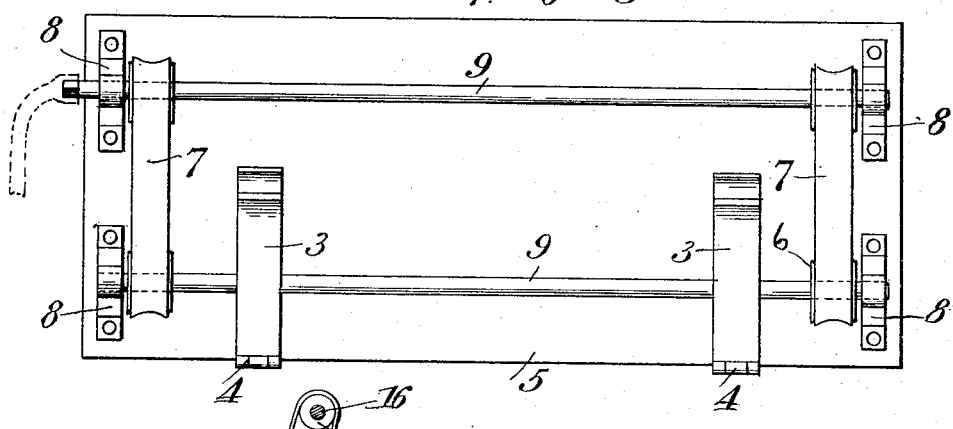
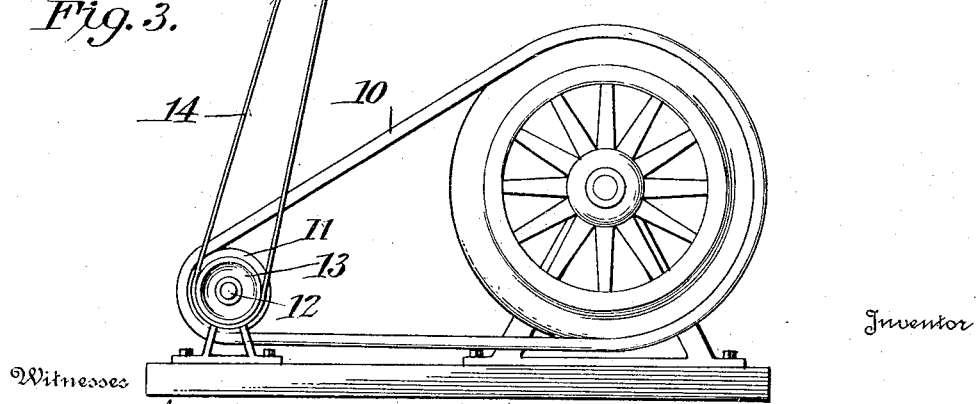
Witnesses  Inventor
Charles G. Polleys

UNITED STATES PATENT OFFICE.

CHARLES G. POLLEYS, OF NEWARK, NEW JERSEY.

POWER-TRANSMITTING APPARATUS FOR AUTOMOBILES.

1,219,040. Specification of Letters Patent. Patented Mar. 13, 1917.

Application filed November 3, 1915. Serial No. 59,410.

*To all whom it may concern:*

Be it known that I, CHARLES G. POLLEYS, a citizen of the United States, residing at Newark, in the county of Essex and State of New Jersey, have invented certain new and useful Improvements in Power-Transmitting Apparatus for Automobiles; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in apparatus for use in connection with automobiles for transmitting power for various purposes other than in the propulsion of the vehicle.

The invention consists of a simple and efficient apparatus of this nature having various details of construction, combinations and arrangements of parts which will be hereinafter fully described, shown in the accompanying drawings and then specifically defined in the appended claim.

My invention is illustrated in the accompanying drawings, in which:

Figure 1 is a side elevation showing the rear wheels of an automobile adjusted in place to operate the transmission mechanism.

Fig. 2 is a top plan view of the transmission mechanism with the wheels of the automobile removed.

Fig. 3 is a detail in elevation of a modified form.

Fig. 4 is a detail view in section of the preferable form of belting for use.

Reference now being had to the details of the drawings by numeral, 1 designates the transmission axle of an automobile and 2 the driving wheels thereon. The transmission mechanism forming the present invention consists of the hinged shaft supporting members 3 which are hinged at 4 to the base 5, their upper free ends being grooved for the reception of said axle of the vehicle to hold the same stationary while the wheels are rotating. Mounted in the standards 8 upon said base are the shafts 9 upon which the pulleys 6 are fixed and power may be transmitted from said shaft to any suitable location. An endless belt 7 passes about said pulleys 6, a detail of the preferable form of a belt especially adapted for use being shown in Fig. 4, and which is concaved as shown and designed to fit the convexed surface of the tread of a tire. Said belt is preferably formed of two layers of material, the edges thereof being inturned to provide enlarged edges. From the foregoing, it will be seen that the wheel 2 of the machine, which operates on the belt 7, is supported at a point adjacent the periphery of the pulleys 6 with the result that the enlarged edges of the belt 7 prevent lateral movement of the wheels with relation to the belt.

In Fig. 3 of the drawings, I have shown a modification in which the automobile is shown in the same manner as in Fig. 1 but a belt 10, preferably concaved, is adapted to pass about the periphery of a wheel and transmits power direct to a pulley 11 fastened to the shaft 12, which shaft also carries a pulley 13, while 14 designates a belt passing about the pulley 13 and the pulley 15 on a counter shaft 16.

By the provision of an apparatus made in accordance with my invention, it will be noted that a device is provided whereby the power of an automobile may be utilized for various purposes other than that originally intended for driving the machine. While I have described the means of transmitting through a belt, it will be understood that various other transmission means may be employed, if desired, without departing from the spirit of the invention.

What I claim to be new is:—

In a power transmitting device, a base, pulleys mounted on the base, a belt having enlarged edges forming a concaved upper surface, operating over the pulleys, the upper surface of the belt coöperating with a driving wheel of a vehicle, said driving wheel being supported adjacent the periphery of the pulleys, and means for preventing movement of the driving wheel longitudinally of the belt.

In testimony whereof I hereunto affix my signature in presence of two witnesses.

CHARLES G. POLLEYS.

Witnesses:
HERMAN SCHARRINGHAUSEN,
ANNA W. WEBER.

Copies of this patent may be obtained for five cents each, by addressing the "Commissioner of Patents, Washington, D. C."